United States Patent Office 3,192,661
Patented July 6, 1965

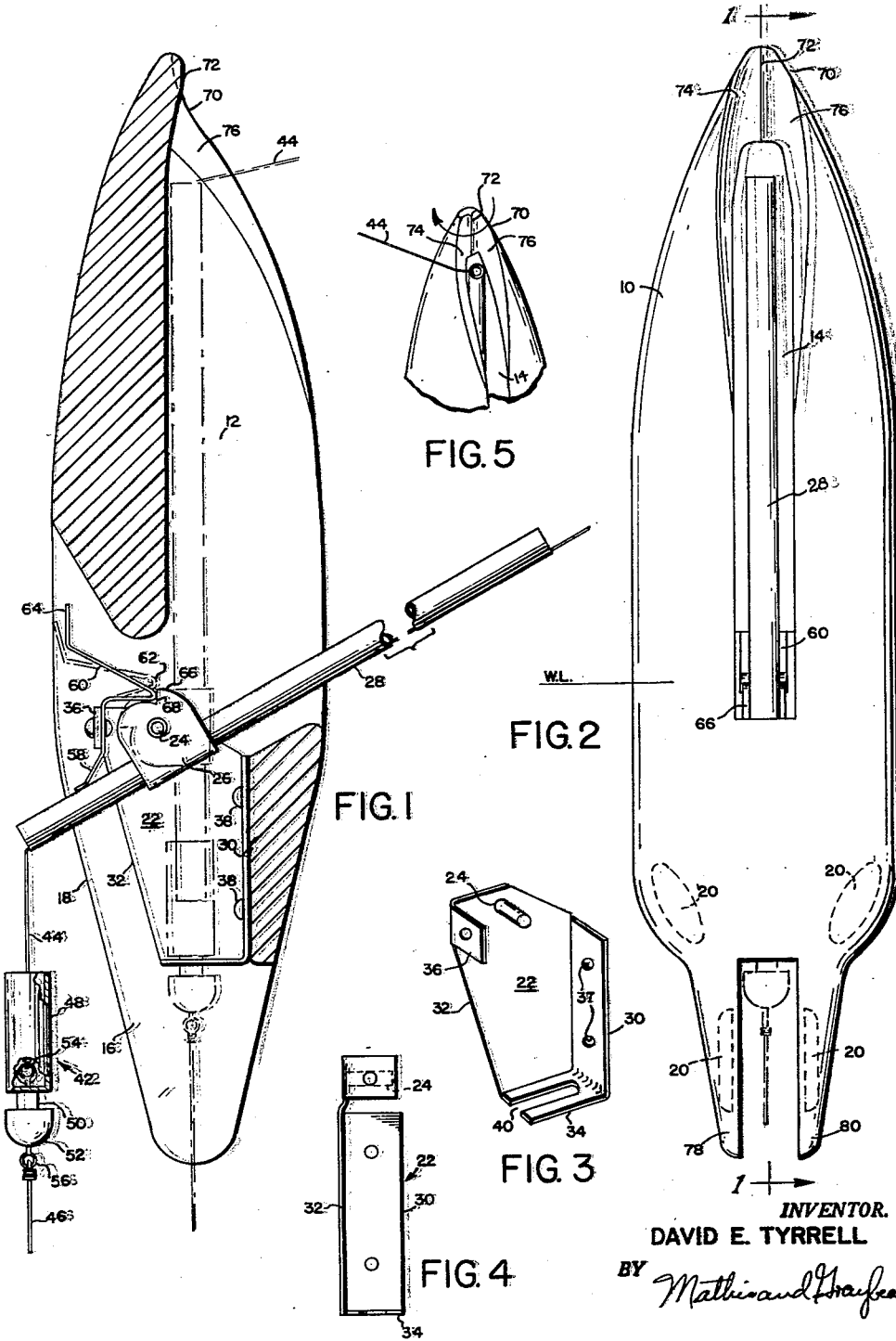

3,192,661
CASTING BOBBER WITH SELECTIVE LINE
RELEASE
David E. Tyrrell, 1526A Spruce Ave., Bremerton, Wash.
Filed Nov. 28, 1962, Ser. No. 240,758
6 Claims. (Cl. 43—44.88)

The present invention relates to fishing line bobbers or floats, as they are sometimes called, of the type used primarily by sports fishermen to cast and support the fishing line and to signal that a fish is nibbling the bait. More particularly, the invention relates to mechanisms adapted for releasably locking a fishing line to such a bobber during casting and while the bobber is drifting or being carried by the tide or current to a desired destination in the water, and when such desired destination is reached releasing such fishing line in response to a tug on the fishing line by the fisherman, and thereafter allowing the line to freely slide through passage means in said bobber to place the bait at fishing depth. The bobber of the present invention is especially suitable for use in ocean or river fishing.

Known fishing line bobbers are either securely fastened to the fishing line (usually by tying) or are freely slideable relative thereto. Obviously, bobbers of the first type must be fastened to the fishing line a distance away from the hook equal to the desired fishing depth in order for the baited hook to be placed at fishing depth when the bobber is in the water floating. Usually such distance involves a matter of several feet. This arrangement is disadvantageous because it is difficult to cast when the hook and sinker are dangling on the end of the line several feet away from the bobber. The weight of the bobber sometimes opposes the weight of the sinker during casting, cutting down on the distance attainable by casting, and the hook and/or sinker many times snags on trees, bushes and the like, out of the path of travel of the bobber but within their reach on the end of the line, or whip back and wrap around and tangle on the bobber or the main fishing line. These problems are not possessed by the second type of known bobbers because such bobbers are free to slide relative to the line. They assume a position adjacent the hook during casting and their weight aids rather than hinders the casting operation, and snagging is not as likely to occur. However, soon as the bobber is in the water the fishing line immediately slides therethrough as it is fed out by the fisherman from the shore, and the sinker on the end of the line serves to anchor the bobber from drifting with the stream or tide. This is disadvantageous because it is sometimes desirable to have the baited hook placed at a location in the water further downstream or further out from the bank than the bobber can be cast. Another disadvantage of bobbers of this type is that the bobber can easily slide off the end of the fishing line in the event the leader line breaks.

A principal object of the present invention is to provide a bobber capable of being attached to the fishing line adjacent to the hook end thereof, to remain so attached during casting and while the bobber drifts with the tide or stream to a desired fishing location, and then in response to a sharp tug on the fishing line by the fisherman become detached from the line, allowing the line to slide therethrough to place the baited hook at fishing depth. The hook and sinker cannot cause tanglement of the lower portion of the fishing line around the bobber because during casting the hook and sinker are located near the bobber. However, as soon as the line is released from the bobber when the same is in the water, the fisherman can substantially pick his own fishing depth by the amount of line let out.

Another object of the present invention is to provide a bobber-fishing line arrangement which prevents loss of the bobber from the line in the event the leader line breaks.

Characteristically, the fishing line bobber of the present invention comprises an elongated buoyant body weighted at one end thereof, making it float in a substantially upright or vertical position, and a line locking and release mechanism contained within inner cavities of said body. Preferably, the line locking portion of the line locking and releasing mechanism comprises a slotted member rigidly attached to the bobber body and a spool shaped element attached to the fishing line. The fishing line is locked to the bobber body by inserting a throat portion of said spool-shaped element into the slot portion of said slotted member. The line releasing portion of said mechanism preferably comprises a tubular member mounted for pivotal movement above the slot and adapted to be engaged by a portion of said spool-shaped element when the same is in turn engaged by the slot and the tubular member is in an upright or substantially vertical position. With the fishing line extending through the tubular member, and with the tubular member and spool-shaped element occupying their just described positions, the fishing line and bobber are securely locked together and neither can slide relative to the other. The fishing line is released or unlocked from the bobber by simply tugging on the fishing line at some point above the bobber. In response to such tugging the fishing line exerts a turning force on the upper end portion of the tubular member, causing the tubular member to pivot to an inclined position, resulting in the lower end portion thereof disengaging the spool-shaped element from the slot as it swings.

Related features of the present invention include a stop member positioned adjacent the lower end portion of said tubular member to limit the pivotal movement of said tubular member beyond a predetermined inclined position, and manually releasable catch means preventing return rotation of the tubular member and thereby retaining the same in its inclined position until the catch means is released. These features assure free movement of the fishing line through the tubular member when such fishing line is not locked to the bobber, i.e. the fishing line is held away from the bobber where it cannot easily snag or tangle itself on or around the slotted member.

As a further and an important related feature of the present invention a camming surface is provided on the bobber body immediately around an opening in the same through which the fishing line is received, and such camming surface cooperates with the fishing line to properly orient the bobber in the water relative to the line in response to an initial tug on the fishing line so that the line of force of an additional tug on the fishing line is directed perpendicular to the axis of rotation of the tubular member, making pivotal movement of such tubular member possible when such additional tug is executed.

Another object of this invention is to provide a fishing float bobber of the aforementioned character capable of being constructed in a variety of sizes, which is efficient and reliable in use, is inexpensive to manufacture, and is attractive in appearance.

These and other features and characteristics of the invention will be apparent from the following description and accompanying illustrations of typical and therefore, nonlimitive forms thereof, wherein like numerals refer to like parts and wherein:

FIG. 1 is a side sectional view showing some parts in elevation and including a solid line showing of the tubular line receiving member in its inclined position, and a dashed line showing of such tubular member in its vertical position;

FIG. 2 is an elevational view of the bobber of the present invention looking into the line receiving opening thereof;

FIG. 3 is a pictorial view of a unitary insert attachable to a side wall of a cavity of the bobber and forming a support for the slotted member, the stop, the spring catch and the axle for the tubular member;

FIG. 4 is an end elevational view of the insert of FIG. 3; and

FIG. 5 is a fragmentary pictorial view of the top portion of the bobber of the present invention and showing the camming surface provided around the line receiving opening.

Referring now to the drawings, the fishing bobber of this invention includes an elongated body 10 of wood, cork, buoyant plastic, or the like, having an upper cavity 12 communicating with an elongated, slot-like line receiving opening 14, and a lower cavity 16 communicating with an elongated, slot-like line discharging opening 18. Lead weights 20, or the like, are embedded in the lower portion of body 10, lowering the center of gravity of the same and causing it ot float with its longitudinal axis extending substantially vertically.

A retainer member 22 fastened to a side wall of lower cavity 16 serves to mount a pin or axle 24 about which a hub 26 rotates. Hub 26 mounts a line receiving tube or tubular member 28 for pivotal motion between a substantially vertical line-lock position (shown by broken line in FIG. 1) and an inclined line-release position (shown by solid lines in FIG. 1). Line receiving tubular member 28 is an element of the line locking and releasing mechanism of the present invention, and its operation is fully explained hereinafter. The ends of tube 28 are made smooth as by welding a chrome ring or eye (not shown) thereto so as to eliminate sharp edges that would fray the fishing line.

Referring now to FIGS. 3 and 4, the retainer member 22 includes a mounting plate 30 connected along one side edge to a side plate portion 32 and connected at its lower end to a slotted bottom portion 34. Side plate 32 extends above the upper end of mounting plate 30 and carries the pin or axle 24 and a mounting tab 36 for a stop member and releasable catch element (to be hereinafter described) on the extended portion. Back plate 30 is preferably provided with a pair of spaced openings 37 for receiving screws 38, or the like, for retainer member 22 to the rear wall of lower cavity 16.

Slotted bottom portion 34, stop and catch mounting tab 36 and axle mounting side plate 32 are preferably formed from a single piece of metal bent to the configuration just described and best shown in FIG. 3 of the drawing. However, each of the elements could just as well be separately mounted elements and such arrangement would be within the scope of the present invention.

An elongated slot 40 opening towards opening 18 is provided in slotted bottom portion 34 and forms a second portion of the line locking and releasing mechanism of the present invention.

Referring again to FIG. 1, a spool-shaped element, or bobbin, is tied in the fishing line, preferably between the main fishing line 44 and a leader line 46. The baited fishing hook and a sinker (not shown) are located adjacent each other on the lower end portion of leader 46.

From top to bottom, bobbin 42 comprises an upwardly opening sleeve 48, a relatively narrow throat 50, and an end plug 52. Main fishing line 44 extends into leeve 48 and ties to a connecting ring 54, and leader line 46 ties to a second connector ring 56 depending below end plug 52.

The operation of the mechanism so far described is as follows: With tube 28 in its inclined position, sleeve 48 of bobbin 42 is inserted over the lower end thereof and then the tube 28 and bobbin 42 are rotated together into an upright position, with throat 50 of bobbin 42 sliding into slot 40 and becomes engaged thereby. In this position (shown by broken lines in FIG. 1) bobbin 42 and consequently line 44 are locked to bobber 10, because sleeve 48 and end plug 52 have diameters too large to pass through relatively narrow slot 40. Line 44 is situated at right angles to axle 24 and a tug on such line exerts a clockwise moment on tube 28 causing it to pivot about axle 24 and swing into its inclined position. At the same time, by virtue of the lower end portion of tube 28 contacting sleeve 48, bobbin 42 is moved out of engagement of slot 40 by said lower end portion as it swings to its inclined position. Once bobbin 42 is free of slot 40, fishing line 44 in turn is free to slide through tube 28 and will do so as long as it is fed out by the fisherman. Thus, tube 28, slot 40 and bobbin 42 together form the line locking and releasing mechanism of the present invention.

As a related feature of the invention, stop and catch means are provided for limiting the pivotal movement of tube 28 and locking the same in a predetermined inclined position until the catch is manually released and the tube is manually returned to its upright position. More specifically, the stop means comprises an abutment or stop member 58, preferably comprising a stiff leaf spring member depending from tab 36 of member 22, as shown. Stop member 58 contacts and prevents further pivotal movement of tube 28 once the same reaches a desired inclined position, as shown in FIG. 1.

The releasable catch means locking tube 28 against return rotation comprises a leaf spring detent 60 extending upwardly from and anchoring on tab 36 of member 22 (FIG. 1), and a circular ratch formed on a portion of the periphery of hub 26. When tube 28 is upright and while it is rotating between its upright inclined positions the pawl portion 62 of detent 60 rides atop of curved surface 66 on hub 26. When the lower end portion of tube 28 contacts abutment 58 pawl 62 drops into abutting engagement with a notch 68, formed on hub 26, and prevents return rotation of tube 28 out of its inclined position. Tube 28 is released from its inclined position by manually pulling tab 64 to the left until pawl 62 is moved a sufficient distance out of notch 68 to allow manual return rotation of tube 28 to its upright position (shown by broken lines in FIG. 1). When detent 60 is riding on surface 66, it is bowed and exerts a clamping pressure against surface 66, which must be overcome in order to rotate tube 28 towards its inclined position. The clamping force thus prevents accidental releasement or unlocking while casting or due to the force of the current opposing the pull on the line during drifting of the bobber in the water. Accdiental or premature releasement of the line is further prevented by the location of the center of rotation of tube 28 closer to its lower than to its top end. By such arrangement it is obvious that tube 28 must move in a substantial distance at its upper end before bobbin 42 is disengaged. Thus, small forces exerted on the line such as inertia forces during casting and current forces during drifting can cause some amount of swing of tube 28 without causing disengagement.

Before the line releasing mechanism heretofore described can function to release line 44 from its locked position the axis of rotation of axle 24 must be situated substantially at right angles to the line of pull of the fishing line and opening 14 must substantially face the fisherman. Obviously, the bobber will not always be properly oriented in the water when it is desired to operate the releasing mechanism and will most likely be improperly oriented. Correct or proper orientation is achieved in accordance with the present invention by an initial light tug on the fishing line by the fisherman. To aid the achievement of proper orientation a camming surface 70 is formed on body 10 around the top end portion of opening 14. As clearly shown in FIG. 5, when the bobber is mis-alined or improperly oriented relative to the line of pull of flishing line 44, the fishing line 44 bends around camming surface 70 and when pulled tends to straighten itself out in doing so exerts a rotation force on the camming surface 70, causing in turn the rotation of the bobber until line 44 is straightened out and proper orientation is achieved.

In this manner the bobber 10 is rotated into line releasing position by the first tug of the fisherman on the line 44, with additional pull resulting in the releasement of the locking mechanism.

Camming surface 70 includes a central ridge 72 formed by the intersection of two twisting side surfaces 74, 76, symmetrically arranged with respect to central ridge 72 and the vertical center line of the bobber as pictured in FIG. 2. At their lower ends the side surfaces 74, 76, of camming surface 70 are substantially parallel to each other and the plane in which tube 28 rotates. Side surfaces 74, 76, then twist in symmetric fashion as they move upwardly, with their outside edges increasing diverging from said plane of travel of tube 28 until at the extreme tops of the bobber the angle between surfaces 74, 76 is substantially above 180°, in fact more nearly 270°.

Referring again to FIG. 2, a pair of substantially parallel stabilizing fins 78, 80 may be provided on the lower end of body 10 to aid orientation of the bobber in the water. The current acts against the relatively flat side of fins 78, 80 and tends to cause them to rotate until aligned substantially parallel to the direction of pull on the line.

The proposed use of the bobber of the present invention is as follows: Fishing line 44 is locked to the bobber 10 in the manner heretofore described. The fisherman then firmly grasps the fishing pole from which the fishing line 44 depends and moves the same through a vertical or oblique arc to propel the bobber through the air and into the water many feet away from the point where he is standing. When the bobber 10 strikes the water, it immediately takes an upright position due to weighted lower end, and leader line 46 simultaneously straightens out and depends downwardly in the water below the floating bobber, because of the sinker at its lower end. However, the sinker does not sink deep enough to anchor bobber 10 against floating. The fisherman next allows the bobber to drift or be carried by the water to a desired fishing location, feeding out whatever line is necessary to make such possible. When the desired location is reached the fisherman gives a first light tug or jerk on the fishing line 44, causing the same to bear against camming surface 70 and properly orient the bobber 10, if not already properly oriented, and then gives a second but sharper tug or jerk on the line 44, causing tube 28 to swing or pivot into its inclined position and push bobbin 42 out from slot 40 as it moves. As soon as bobbin 42 is free of slot 40, the weighted end of leader line 46 pulls the fishing line through the tube 28 as long as additional line is let out by the fisherman. The tube is held in its inclined position by the catch mechanism, as heretofore described.

Preferably the color pattern of bobber 10 is such that the bobber can be seen a long distance away. Possible colors and color combinations of body 10 include bright yellow, bright red, red and white, and any of the luminous colors. Preferably, camming surface 70 is of a different bright color than the rest of the bobber so that the fisherman can clearly see when camming surface 70 is facing him. The bobber 10 is preferably constructed from a buoyant plastic substance, such as polystyrene but could just as well be constructed from wood, cork or some other buoyant substance.

The foregoing is considered as being merely illustrative of the principles of the present invention and not limitative. Since changes, variations, and modifications in the form, construction and the arrangement of the elements shown and described may be had without departing from the spirit of the invention, it is to be understood that the invention is limited solely by the scope of the appended claims, rather than by any details of the illustrative showing and foregoing description.

Having thus described certain typical forms of my invention, what I claim is:

1. In combination with a fishing line, a bobber having an elongated buoyant body formed to include an inner space; a line receiving tubular member in said inner space, with said fishing line passing through said tubular member; means intermediate the length of said tubular member mounting said tubular member on said bobber for pivotal movement, between a substantially upright position and an inclined position, in response to a tug on the fishing line from above the bobber, with a lower end portion of said tubular member extending below, and an upper end portion extending above, the pivot point; means on said bobber forming a slot that is wider than the fishing line, so that the fishing line itself may pass freely through said slot; and a holding element on said fishing line below said tubular member, said holding element being wider than, and unable to pass through, said slot, and being engaged and held by said slot forming means when said tubular member is in a substantially upright position over the slot forming means, so as to lock the bobber on the fishing line, and being disengaged from the slot forming means by the lower end portion of the tubular member as the same is pivoted out from a substantially upright position over the slot forming means by a tug on the fishing line from above the bobber, so as to unlock the bobber from the line and permit free movement of the fishing line through the tubular member, relative to the bobber.

2. The combination of claim 1, wherein a portion of said holding element extends adjacent the lower end portion of said tubular member when the same is in a substantially upright position, so as to be moved by the lower end portion of said tubular member during pivotal movement of the same from a substantially upright to an inclined position, and in that manner cause said disengagement of the holding element from the slot forming means.

3. The combination of claim 1, further including stop means preventing pivotal movement of said tubular member past a predetermined inclined position.

4. The combination of claim 1, further including stop means preventing pivotal movement of said tubular member past a predetermined inclined position, and releasable locking means locking said tubular member in position when against said stop means until released therefrom.

5. The combination of claim 4, wherein said releasable locking means comprises a protuberance etxending laterally outwardly from said tubular member and a spring biased, manually releasable catch member mounted on said bobber, said catch member engaging and holding said protuberance when said tubular member is against said stop means, unless released.

6. For use in combination with a fishing line having a fishing hook at one end and held at the other end under control of a fiisherman; a fishing line bobber, comprising:
 (a) guide means on said bobber through which said line freely passes through said bobber;
 (b) a stop element attached to said line between said guide means and the hook end of said line;
 (c) a retaining means on said bobber configured to engage and retain at least a portion of the stop element between said guide means and said retaining means; and (d) means permitting relative movement between said guide means and said retaining means responsive to a tug on the held end of the fishing line, applied generally laterally of the bobber, such relative movement disassociating said stop element from said retaining means and from said guide means to release said bobber from the fishing line and enable free movement of the bobber along the portion of the fishing line between said stop element and the held end of the line.

References Cited by the Examiner

UNITED STATES PATENTS

| 1,606,240 | 11/26 | Klaserner | 43—43.13 |
| 2,322,241 | 6/43 | Kurz | 43—43.13 |
| 2,609,634 | 9/52 | Simpson | 43—44.88 |
| 2,785,499 | 3/57 | Simpson | 43—44.88 |
| 2,952,937 | 9/60 | Wassing | 43—44.9 X |

FOREIGN PATENTS

| 247,386 | 12/47 | Switzerland. |

ABRAHAM G. STONE, *Primary Examiner.*